United States Patent
Deng et al.

(10) Patent No.: US 9,529,893 B1
(45) Date of Patent: Dec. 27, 2016

(54) SEARCH ENGINE ANALYTICS AND OPTIMIZATION FOR MEDIA CONTENT IN SOCIAL NETWORKS

(71) Applicant: INTERNATIONAL BUSINESS MACHINES CORPORATION, Armonk, NY (US)

(72) Inventors: Yu Deng, Yorktown Heights, NY (US); Jenny S. Li, Danbury, CT (US); Liangzhao Zeng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/063,676

(22) Filed: Mar. 8, 2016

Related U.S. Application Data

(63) Continuation of application No. 14/838,813, filed on Aug. 28, 2015.

(51) Int. Cl.
    *G06F 17/30* (2006.01)
(52) U.S. Cl.
    CPC ..... *G06F 17/30598* (2013.01); *G06F 17/3053* (2013.01); *G06F 17/30867* (2013.01)
(58) Field of Classification Search
    None
    See application file for complete search history.

(56) References Cited

U.S. PATENT DOCUMENTS

| | | | | |
|---|---|---|---|---|
| 8,606,792 | B1 * | 12/2013 | Jackson | G06F 17/30699 707/748 |
| 2011/0231296 | A1 * | 9/2011 | Gross | G06Q 10/10 705/37 |
| 2014/0189572 | A1 | 7/2014 | Martens et al. | |
| 2015/0363402 | A1 * | 12/2015 | Jackson | G06F 17/3053 707/723 |

FOREIGN PATENT DOCUMENTS

WO     2015066591 A1    5/2015

* cited by examiner

*Primary Examiner* — Anh Tai Tran
(74) *Attorney, Agent, or Firm* — Cantor Colburn LLP; William A. Kinnaman, Jr.

(57) ABSTRACT

Embodiments include method, systems and computer program products for searching a social network for media content. Aspects include receiving a query for media content related to a topic from a user, identifying a plurality of content items associated with the topic and determining a quality score for each of the plurality of content items. Aspects also include providing a subset of the plurality of content items to the user, wherein the subset is selected based on the quality score and updating the quality score of one or more content items in the subset based on a behavior of the user in viewing the subset of the plurality of content items.

1 Claim, 4 Drawing Sheets

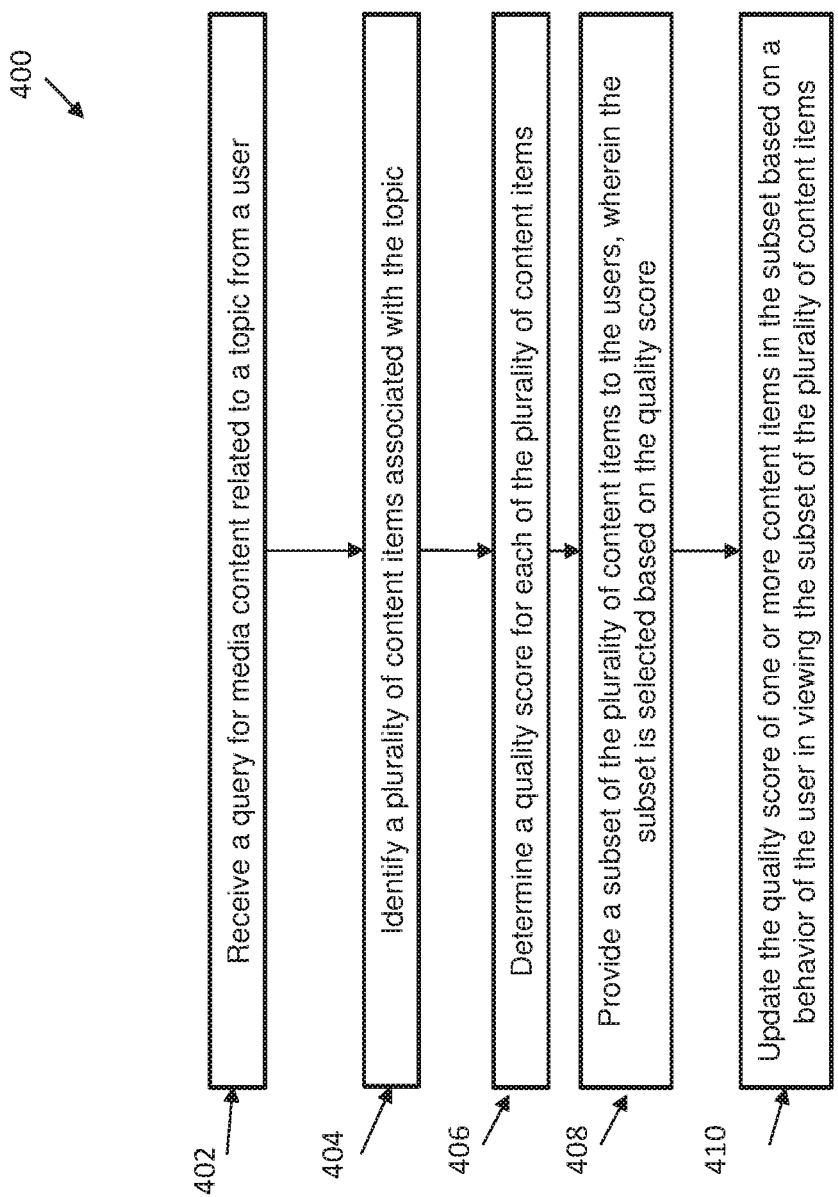

SEARCH ENGINE ANALYTICS AND OPTIMIZATION FOR MEDIA CONTENT IN SOCIAL NETWORKS

DOMESTIC PRIORITY

This application is a continuation of the legally related U.S. application Ser. No. 14/838,813 filed Aug. 28, 2015, which is fully incorporated herein by reference.

BACKGROUND

The present disclosure relates to social networks and more specifically, to methods, systems and computer program products for providing search engine analytics and optimization for media content in social networks.

Recently, social networks have become an increasingly popular way for people to communicate with each other. One common use of social networks is for users to post media content items, such as pictures and videos, for others to see. In many cases the users may choose to associate one or more topics with the media content that they post. For example, users may associate one or more hashtags with a piece of content that they post. Users of the social network are able to search the social network for media content items that are related to various topics by searching for specific topics/tags.

One drawback to the current searching functions of social networks is that the results are presented based on the recency of when they were posted and the results are not ranked or filtered by their relevance to the topic searched. Currently, a user can associate any topic with a content item that they post, whether or not the content item is related to the topic. As a result, sometimes not all content items are related to the topics that users associated it with. This creates a problem for users who would like to search for content items related to a certain topic/tag in a social network.

SUMMARY

In accordance with an embodiment, a method for operating a search engine for media content in a social network is provided. The method includes receiving a query for media content related to a topic from a user, identifying a plurality of content items associated with the topic, and determining a quality score for each of the plurality of content items, wherein the quality score is an indication of a correlation between each of the plurality of the content item and the topic. The method also includes providing a subset of the plurality of content items to the user, wherein the subset is selected based on the quality score and updating the quality score of one or more content items in the subset based on a behavior of the user in viewing the subset of the plurality of content items.

In accordance with another embodiment, a system for searching a social network for media content includes a processor in communication with one or more types of memory. The processor is configured to receive a query for media content related to a topic from a user, identify a plurality of content items associated with the topic, and determine a quality score for each of the plurality of content items, wherein the quality score is an indication of a correlation between each of the plurality of the content item and the topic. The processor is also configured to provide a subset of the plurality of content items to the user, wherein the subset is selected based on the quality score and update the quality score of one or more content items in the subset based on a behavior of the user in viewing the subset of the plurality of content items.

In accordance with a further embodiment, a computer program product for operating a search engine for media content in a social network includes a non-transitory storage medium readable by a processing circuit and storing instructions for execution by the processing circuit for performing a method. The method includes receiving a query for media content related to a topic from a user, identifying a plurality of content items associated with the topic, and determining a quality score for each of the plurality of content items, wherein the quality score is an indication of a correlation between each of the plurality of the content item and the topic. The method also includes providing a subset of the plurality of content items to the user, wherein the subset is selected based on the quality score and updating the quality score of one or more content items in the subset based on a behavior of the user in viewing the subset of the plurality of content items.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 is a flow diagram of a method for operating a search engine for media content in a social network in accordance with an exemplary embodiment.

DETAILED DESCRIPTION

In accordance with exemplary embodiments of the disclosure, methods, systems and computer program products for operating a search engine for media content in a social network are provided. In exemplary embodiments, content providers upload media content to the social network and associate one or more topics with the media content. Media content may include, but is not limited to, photos, videos, or music files. In exemplary embodiments, the search engine of the social network is configured to create a quality score that is used to track a correlation between piece of media content and each associated topic. The quality score can be based on feedback regarding the correlation between each topic and a piece of associated media content that is received from users of the social network or from metrics of how users of the social network interact with the media content and the associated topic. In exemplary embodiments, the search engine of the social network utilizes the quality score to rank the search results that will be provided when a user of the social network searches for media content that is associated with a topic.

Figure 1:
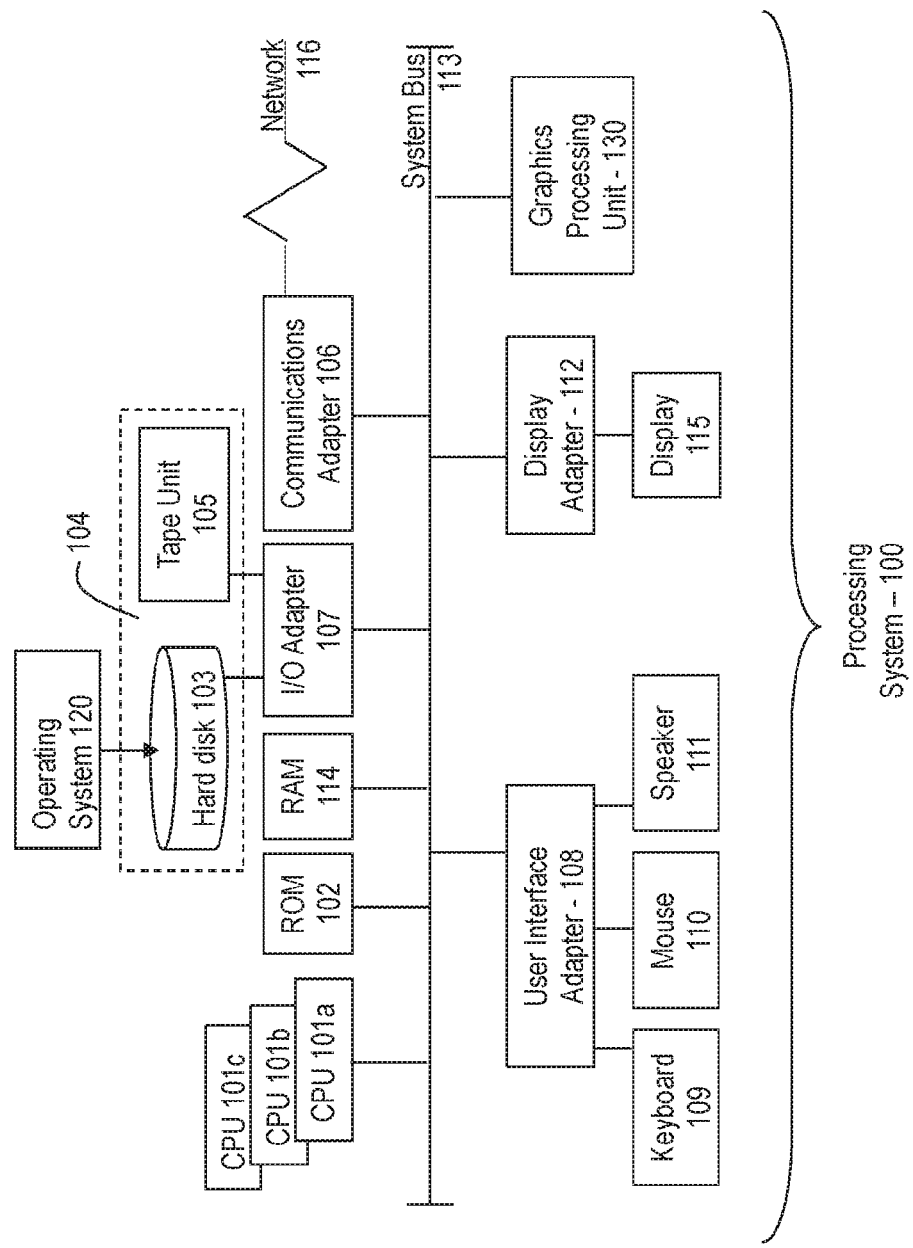
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc.

(collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1. The system 100 may be, but is not limited to, a mainframe computer, a desktop computer, a laptop computer, a mobile phone, a wireless tablet or the like.

Figure 2:
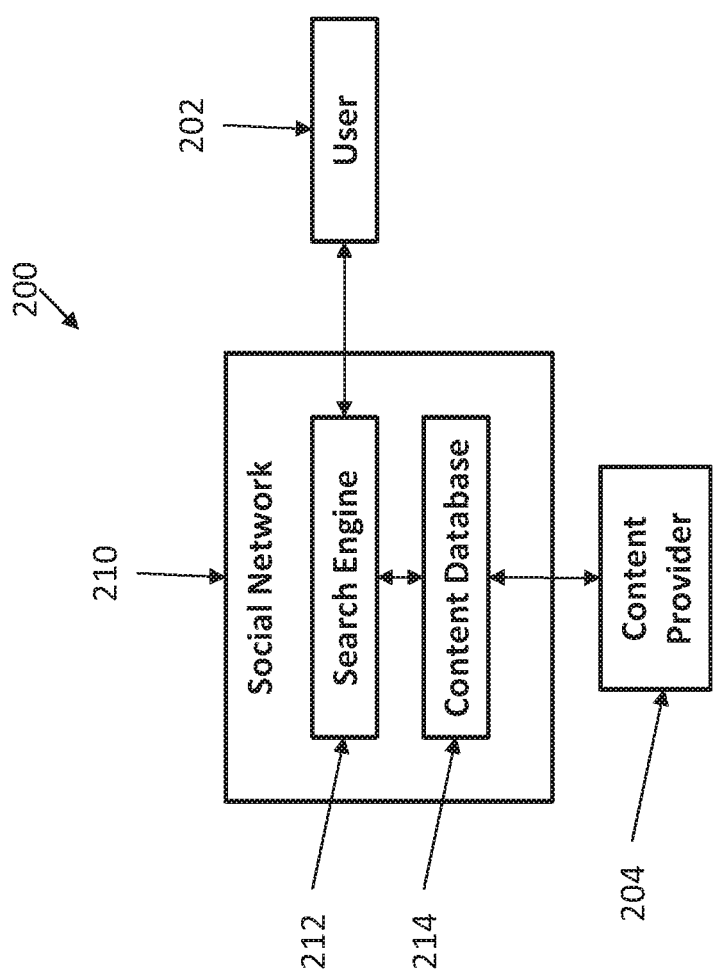
FIG. 2 is a block diagram illustrating a social network in accordance with an exemplary embodiment.

Referring now to FIG. 2, a system 200 including a social network 210 in accordance with an embodiment is illustrated. As illustrated, the system 200 includes a social network 210, a content provider 204 and a user 202. The social network 210 includes a content database 214 configured to store content received from the content providers 204 along with associated topics or tags. The social network 210 also includes a search engine 212 configured to receive a query including a topic from a user 202 and to responsively search the content database 214 for content associated with the topic.

In exemplary embodiments, the search engine 212 of the social network 210 is configured to create a quality score that is used to track a correlation between each topic and a piece of associated content. The quality score is stored in the content database 214 and can be based on feedback regarding the correlation between each topic and a piece of associated content that is input from users 202 of the social network 210 or from metrics of how users 202 of the social network 210 interact with the content and the associated topic. In exemplary embodiments, the search engine 212 of the social network 212 utilizes the quality score in ranking the search results that will be provided when a user 202 of the social network 210 searches for media content that is associated with a topic.

In exemplary embodiments, the search engine 212 of the social network 210 is configured to monitor a behavior of the users 202 of the social network 210 and to capture information that is indicative of the relevancy of content items to the associated topics. For example, upon receiving a query from a user 202 for topic A, the search engine 212 provides a list of content items. The search engine 212 can then monitor the behavior of the user 204 with respect to the content items provided and can extract relevancy information from the user's behavior. For example, if a user 202 spends more time viewing a particular content item, expresses liking a particular content item, writes a comment relating to a particular content item, or follows a content provider 204 of a particular content item it is a good indication that the content item is relevant to the searched topic. The search engine 212 can monitor the interaction of the user 202 with the content items provided and can use the interaction information to create and/or modify the quality score of the content items. The quality score of the content items can then be used by the search engine in determining how to rank the search results for new queries.

In exemplary embodiments, the search engine 212 can also create and/or update the quality score based on explicit feedback regarding the correlation between topics and a piece of associated content that is received from a user 202 of the social network 210. For example, upon receiving a query from a user 202 for topic A, the search engine 212 provides a list of content items. The search engine 212 can then provide the user 202 with a user interface option to indicate a positive correlation between the searched topic and the content item (e.g., the content item is related to the searched topic) and/or a negative correlation between the searched topic and the content item (e.g., the content item is not related to the searched topic.

In exemplary embodiments, the search engine of the social network is configured to use a ranking algorithm to sort the search results provided to a user in response to a query. The ranking algorithm may use a combination of the quality score, which represents the relevancy of the searched topic to the content times, and a time associated with the content items, such as when the content was posted, to rank the content items for displaying to the user. In another embodiment, the ranking algorithm may only use the quality score to rank the content items for displaying to the user. In another embodiment, positive or negative feedback of a content from a plurality of users who searched on the same topic can contribute to the calculation of a quality score.

In exemplary embodiments, if a content item has a high percentage of negative feedback explicitly expressed by users compared to the positive feedback (or the percentage is below a certain threshold), the content item may be included in a mismatch topic list. In addition, content items that are identified as belong to the mismatch topic list may have the improperly associated topic removed automatically or by social network teams after review.

Figure 3:
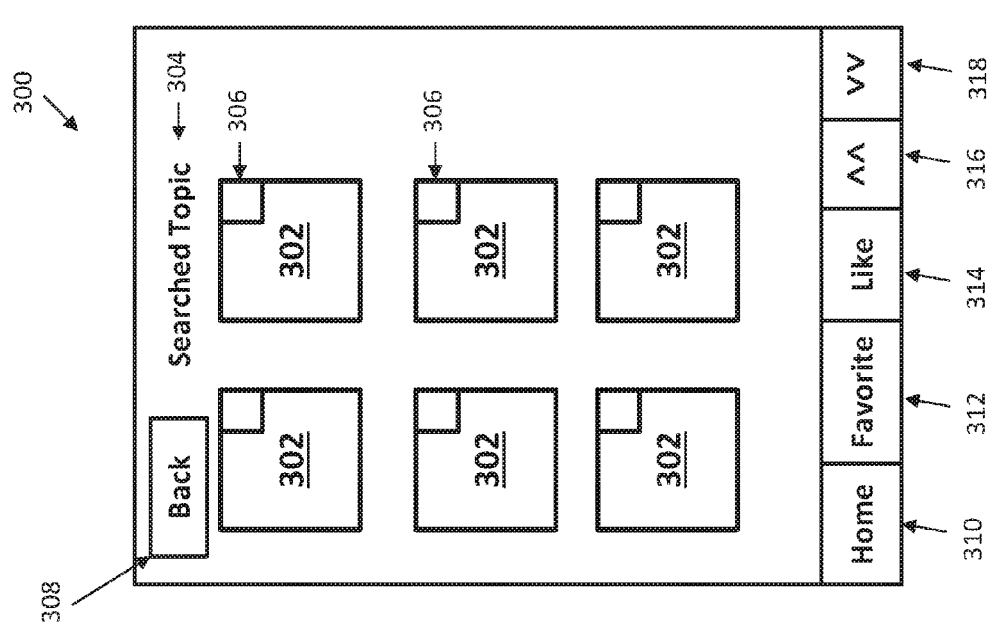
FIG. 3 is a block diagram of a user interface for receiving an indication of a correlation between a searched topic and content items in a social network in accordance with an exemplary embodiment.

Referring now to FIG. 3, a user interface 300 for allowing a user to indicate a correlation between the searched topic and content items in a social network in accordance with an exemplary embodiment is provided. As illustrated, the user interface 300 displays a plurality of content items 302 that are related to a search topic 304. The user interface 300 includes a plurality of user controls that include, but are not limited to, a back button 308, a home button 310, a favorite button 312, a like button 314, a relevant button 316 and a not relevant button 318. In exemplary embodiments, the user can select the like button 314 to express his or her liking to the media content. The user can select the favorite button 312 to express the media content is one of his or her favorite and enable the system to mark and store the media content in his or her favorite list. The user can select the relevant button 316 or the not relevant button 318 to express his or her opinion about the relevancy of the media content with respect to the searched topic. In exemplary embodiments, after a user selects one or the favorite button 312, the relevant button 314 and the not relevant button 316, a selection box 306 is overlaid on each content item 302 and allows a user to select the content items 302 that correspond to the selected category (favorite, relevant, not relevant). As will be appreciated by those of ordinary skill in the art, a similar user interface can be used for the viewing of a single content item as well. In addition, when viewing content items that have multiple associated topics, the user interface can allow the user to indicate whether the content item is relevant or not relevant to each of the separate topics.

In exemplary embodiment, the search engine of the social network may track the behavior of a user of the social network to create and store a topic relationship database. For example, if a user searches for a first topic, selects an image from the search results, and then from the selected image selects another associated topic, it may be used as an indication that both topics are related. Accordingly, the topics can be stored as related in the topic relationship database. The topic relationship database can then be used by the search engine to determine what content items may be relevant to a searched topic.

In one example, a user searches for a topic of "chicken" and selects an image from the set of results. Next, the user clicks on a topic of "salad" from the selected image, which instructs the search engine to perform a search for the topic "salad." In this example, a linkage between chicken topic and salad topic is created and stored in the topic relationship database. In exemplary embodiments, the search engine may be configured to look up a search topic received from a user in the topic relationship database and if the user requests a repeated search, content items that have the requested topic and also have linked topics may be presented higher in the search results. In exemplary embodiments, the topic relationship database can be used track both individual topic linkages as well as social network wide topic linkages that are aggregated from a plurality of individual users.

In many cases, malicious content providers may seek to have their posted content viewed as often as possible and may associate irrelevant, but highly popular, topics with content that they post to the social network. In exemplary embodiments, the search engine of the social network may also track the behavior of the content providers and may adjust the quality score of the content items posted by the content providers based on the history of the content provider. In exemplary embodiments, the quality score of an association between a content item posted by a content provider and an associated topic may default to a historical quality score for the content provider based on calculated quality scores for the items previously posted by the content provider. In addition, the quality score of a score of an association between a content item posted by a content provider and an associated topic may be based on a length of time the content provider has been a member of the social network or a number of posts the content provider has made to the social network. For example, new content providers using the social network may have a maximum quality score that increases as their use of the social network increases and the relevancy of the content they posted with respect to the associated topics or tags they defined for the content. Such a maximum quality score for new users can serve to reduce the problem of individuals creating new accounts for a social network and posting content items and associating them with irrelevant and popular topics.

Referring now to FIG. 4, a flow diagram of a method 400 for operating a search engine for media content in a social network in accordance with an exemplary embodiment is shown. As shown at block 402, the method 400 includes receiving a query for media content related to a topic from a user. Next, the method 400 includes identifying a plurality of content items associated with the topic, as shown at block 404. The method 400 also includes determining a quality score for each of the plurality of content items, as shown at block 406. In exemplary embodiments, the quality score is an indication of the correlation between the content item and the topic. Next, as shown at block 408, the method 400 includes providing a subset of the plurality of content items to the users, wherein the subset is selected based on the quality score.

In one embodiment, the subset may include content items that have a quality score above a threshold level. In exemplary embodiments, the content items of the subset may be provided to the user in an order that is determined based on their associated quality score and based on a timestamp associated with the content items. For example, the subset of content items may be selected to include only content items that have a quality score of above 80 and may be presented to the user in an order based on a timestamp associated with the content items. In another embodiment, the subset may include a predetermined number of content items that have the highest quality scores. In exemplary embodiments, the content items of the subset may be provided to the user in an order that is determined based on their relative associated quality scores, i.e., the highest quality score items are displayed first. In exemplary embodiments, the user may determine, and save in their user preferences, what metrics are used in selecting the members of the subset and what metrics are used to order the presentation of the content items.

Continuing with reference to FIG. 4, as shown at block 410, the method 400 includes updating the quality score of one or more content items in the subset based on a behavior of the user in viewing the subset of the plurality of content items. In one embodiment, the behavior of the user in viewing the subset of the plurality of content items includes receiving feedback from the user that one or more content items in the subset is relevant to the topic and/or that one or more content items in the subset is not relevant to the topic. In another embodiment, the behavior of the user in viewing the subset of the plurality of content items includes a user liking one or more content items in the subset. In a further embodiment, the behavior of the user in viewing the subset of the plurality of content items includes an amount of time that a user spends looking at one or more content items in the subset. In yet another embodiment, the behavior of the user in viewing the subset of the plurality of content items includes a user following a content provider that posted one or more content items in the subset.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for operating a search engine for media content in a social network, the method comprising:
- receiving, by a processor, a query for media content related to a topic from a user;
- identifying a plurality of content items associated with the topic;
- determining a quality score for each of the plurality of content items, wherein the quality score is an indication of a correlation between the content item and the topic and wherein the quality score for each of the plurality of content items is further based on a length of time that a content provider of the content item has been a member of the social network;
- providing a subset of the plurality of content items to the user, wherein the subset is selected based on the quality score, wherein the subset includes a predetermined number of content items that have the highest quality scores, wherein the subset of the plurality of content items is provided to the user in a ranked order that is based on a combination the quality score of each of the subset of the plurality of content items and a time that each of the subset of the plurality of content items was posted to the social network;
- updating the quality score of one or more content items in the subset based on a behavior of the user in viewing the subset of the plurality of content items, wherein the behavior of the user in viewing the subset of the plurality of content items includes the user liking one or more content items in the subset, the user following a content provider that posted one or more content items in the subset, and an amount of time the user spends viewing the one or more content items in the subset; and
- further updating the quality score of the one or more content items in the subset further based upon receiving explicit feedback from the user including at least one of an indication of a positive correlation and a negative correlation between the topic and the one or more of the content items in the subset, wherein the indication of the positive correlation is generated by the user via a relevant button on a user interface and wherein the indication of the negative correlation is generated by the user via a not relevant button on the user interface.

* * * * *